United States Patent
Welder et al.

(10) Patent No.: US 11,856,660 B2
(45) Date of Patent: Dec. 26, 2023

(54) HEATING SYSTEM AND PROCESS FOR MANUFACTURING SAME

(71) Applicant: ElringKlinger AG, Dettingen/Erms (DE)

(72) Inventors: Aylin Welder, Dettingen/Erms (DE);
Andreas Hubert, Dettingen/Erms (DE);
Kristina Wilsch, Dettingen/Erms (DE);
Marcel Bold, Dettingen/Erms (DE);
Bernd Ell, Dettingen/Erms (DE)

(73) Assignee: ElringKlinger AG, Dettingen/Erms (DE)

( * ) Notice: Subject to any disclaimer, the term of this patent is extended or adjusted under 35 U.S.C. 154(b) by 769 days.

(21) Appl. No.: 16/626,869

(22) PCT Filed: Jun. 25, 2018

(86) PCT No.: PCT/EP2018/066902
§ 371 (c)(1),
(2) Date: Dec. 26, 2019

(87) PCT Pub. No.: WO2019/002181
PCT Pub. Date: Jan. 3, 2019

(65) Prior Publication Data
US 2021/0298128 A1    Sep. 23, 2021

(30) Foreign Application Priority Data

Jun. 27, 2017 (DE) .......................... 102017210839.8
Feb. 28, 2018 (DE) .......................... 102018104602.2

(51) Int. Cl.
*H05B 3/34* (2006.01)
*F01N 3/20* (2006.01)
(Continued)

(52) U.S. Cl.
CPC ............. *H05B 3/34* (2013.01); *F01N 3/2013* (2013.01); *H05B 3/12* (2013.01); *H05B 3/56* (2013.01);
(Continued)

(58) Field of Classification Search
CPC ... H05B 3/34; H05B 3/12; H05B 3/56; H05B 2203/013; H05B 2203/003;
(Continued)

(56) References Cited

U.S. PATENT DOCUMENTS 3,886,739 A * 6/1975 Lee ..................... F01N 3/2846
60/300
5,981,910 A * 11/1999 Williams ............... F02M 37/30
219/205
(Continued)

FOREIGN PATENT DOCUMENTS

CN    105258385 A *  1/2016
DE      3917107 A1    11/1990
(Continued)

*Primary Examiner* — Shawntina T Fuqua

(57) ABSTRACT

A heating system for a drive train or a component thereof and to a method for producing it. In order to produce an apparatus of the above-mentioned type, which can be inexpensively integrated into an existing system, it is proposed for at least one heating element, which is for active electrical heating of a drive train or component thereof, to be provided in combination with or in an already existing component for thermal and/or acoustic shielding.

13 Claims, 2 Drawing Sheets

(51) Int. Cl.
 *H05B 3/12* (2006.01)
 *H05B 3/56* (2006.01)

(52) U.S. Cl.
 CPC .... *F01N 2240/16* (2013.01); *H05B 2203/003* (2013.01); *H05B 2203/013* (2013.01); *H05B 2203/017* (2013.01)

(58) Field of Classification Search
 CPC ............ H05B 2203/017; F01N 3/2013; F01N 2240/16; Y02T 10/12
 See application file for complete search history.

(56) References Cited

U.S. PATENT DOCUMENTS

| | | | |
|---|---|---|---|
| 6,177,658 B1 | 1/2001 | White et al. | |
| 6,380,523 B1* | 4/2002 | Jones, Sr. | H05B 3/36 219/528 |
| 2002/0092298 A1 | 7/2002 | Bruck et al. | |
| 2003/0116116 A1* | 6/2003 | Anton | F02B 39/00 123/198 E |
| 2009/0101632 A1* | 4/2009 | Naylor | H05B 3/36 219/202 |
| 2012/0121478 A1 | 5/2012 | Kumar | |
| 2021/0123368 A1* | 4/2021 | Akyildiz | B01D 53/9477 |
| 2023/0304427 A1* | 9/2023 | Akyildiz | B01J 35/04 422/177 |

FOREIGN PATENT DOCUMENTS

| | | | |
|---|---|---|---|
| DE | 19931061 A1 | 1/2001 | |
| DE | 202007007849 U1 | 10/2008 | |
| DE | 102008030709 A1 | 12/2009 | |
| DE | 102009005853 A1 | 7/2010 | |
| DE | 102010032088 A1 | 4/2011 | |
| DE | 102012219747 A1 | 5/2013 | |
| DE | 102011057108 A1 | 7/2013 | |
| DE | 102012110268 A1 * | 4/2014 | ............ F01N 13/14 |
| DE | 102013209957 A1 | 12/2014 | |
| DE | 102015100404 A1 | 7/2015 | |
| DE | 102015101945 A1 | 8/2016 | |
| DE | 102015111689 B3 | 10/2016 | |
| DE | 102015121397 A1 | 6/2017 | |
| DE | 102017200881 A1 | 9/2017 | |
| EP | 0174683 A1 | 3/1986 | |
| EP | 0532468 A1 | 3/1993 | |
| EP | 0588004 A1 | 3/1994 | |
| EP | 0783621 A1 | 7/1997 | |
| EP | 0824299 A2 | 2/1998 | |
| EP | 2784283 A2 | 10/2014 | |
| EP | 2784283 A2 * | 10/2014 | ............ B32B 1/08 |
| EP | 2921668 A1 | 9/2015 | |
| EP | 3032058 A1 | 6/2016 | |
| JP | H07139347 A * | 5/1995 | |
| WO | 9610127 A1 | 4/1996 | |
| WO | 2015040396 A1 | 3/2015 | |
| WO | WO-2019004265 A1 * | 1/2019 | ........ B60R 16/0215 |

* cited by examiner

HEATING SYSTEM AND PROCESS FOR MANUFACTURING SAME

FIELD OF THE INVENTION

The present invention relates to a heating system for a drive train or a component thereof and to a method for producing said system.

BACKGROUND OF THE INVENTION

From the prior art, there are various known approaches as to how a heating system can be provided on a drive train, for example of an internal combustion engine, or a component thereof and in particular on an exhaust system. The technical background underlying the need for a heating of an internal combustion engine or at least a component thereof is based on the fact that particularly in a cold start, even under favorable ambient conditions of for example +20° C., it is first necessary to achieve certain operating temperatures in the above-mentioned components in order to ensure a reliable operation. This is especially true for the field of exhaust treatment in which catalytic converters must first be brought to a model-specific operating temperature before a sufficient reduction of pollutants can be achieved by the exhaust gas treatment. In order to keep this time window as small as possible, an active electric heating of components inside a vehicle is known in order to preheat certain components or to bring them to the operating temperature more quickly and thus reduce, for example, the above-indicated cold start emissions in the exhaust gas system. Even if hybrid or electric vehicles can lack an exhaust gas system in the conventional sense, the above-mentioned requirements apply analogously to alternative drive concepts using fuel cells and/or batteries as mass storage devices for electrical energy.

Apart from using fuel that is additionally burned in a catalytic converter for the rapid heating, there are a wide variety of types of heating systems, which are generally used as ohmic resistance heating systems. From other fields of technology, it is known to use heating mats, for example in the home and garden sector, where there are used, for example, as floor heating or wall heating. Heating systems are also used as auxiliary heating systems for example in the chemical and petrochemical industry, in the oil and gas industry, and in the food industry for frost protection and temperature maintenance. In the home-installation sector, such auxiliary heating systems are known for use in hot water supply systems in order to ensure a minimum temperature at an outlet, e.g. a shower, and at the same time, through sufficiently high temperatures, to counteract a contamination and/or bacterial load, particularly by *salmonella*.

Another type of auxiliary heating is disclosed by DE 20 2007 007 849 U1 as part of a frost monitor in the form of a system for conveying and temperature-controlling a urea/water solution in the form of a fluid line composed of plastic. The aim of this, at least in an internal combustion engine, is to prevent the temperature of this solution, which is corrosive and has the ability to creep, from being able to drop below −11° C. in order to avoid clogs in the fluid path caused by coagulation.

Depending on the application, there are currently a variety of solutions for heating various elements in a vehicle. EP 783 621 B1 discloses an electrically heatable honeycomb element as a component of a catalytic converter. WO 2015/040396 A1 discloses an electrically heatable honeycomb structure as a component of a catalytic converter, which is followed by another honeycomb element with a different composition. In a similar fashion, US 2002/0092298 A1 also provides a heat conductor embodied as a honeycomb structure, which is electrically insulated by means of an actual catalytic converter connected downstream of it.

DE 10 2015 111 689 B3 discloses an electrically heatable catalytic converter and a method for producing it; in this instance, the intent is to produce a particular heat distribution through an appropriate embodiment of the heating system in the form of a heat conductor that is completely embedded in an insulation.

In addition to exhaust systems, there is also an optimum operating temperature in batteries. If the temperature is too low, then the batteries cannot be optimally charged, stored, or discharged. As a result, the system that is to be operated cannot be supplied with a prescribed voltage at excessively low operating temperatures. For example, EP 0 588 004 A1 describes an electric storage battery, in particular for a vehicle power plant. In order to reach the optimum operating temperature of about 300° C., in addition to a cooling system and a corresponding insulation, under certain circumstances, it is necessary to heat the battery.

DE 102010032088 A1 describes a method for heating a battery system having at least two batteries or battery sections and the heating of the battery system is carried out by alternating charging and discharging of the battery system with an alternating current.

DE 102009005853 A1 relates to a battery system that includes at least one Peltier element, which is used to cool and/or heat at least one battery. In this connection, optimum temperatures for known battery systems are approx. 20° to 40° C.

In addition to battery systems, it is also important in fuel cell technology to reach a respective optimum operating temperature depending on the fuel cell type. These operating temperatures are scattered over a broad range depending on the type: operating temperatures of 10° to 100° C. are specified for a polymer electrolyte fuel cell, PEMFC for short, and operating temperatures of 450° up to a high temperature range of approx. 1,000° C. are specified for solid oxide fuel cells, SOFC for short. DE 19931061 A1 describes a possible system for heating or also cooling a fuel cell and a corresponding fuel cell system.

The solutions available up to this point cannot be added to an existing system without considerable additional expense. Because of this, maintenance and repairs in the case of defects are very labor-intensive. Furthermore, most of the available solutions require additional installation space, which sharply limits retrofitting options. Prior solutions in the exhaust system sector are also comparatively expensive.

The object of the present invention in this context is to achieve a remedy in the form of a device of the type mentioned at the beginning, which can be inexpensively integrated into an existing system. Another object of the present invention is to achieve a more efficient production process for such a heating system.

SUMMARY OF THE INVENTION

This object is attained according to the invention in a heating system for a drive train or a component thereof in that at least one heating element for active electrical heating of a drive train, e.g. of an internal combustion engine, or a catalytic converter as a component thereof, from higher temperatures above approx. 180° C. up to high temperature ranges of up to 1,000° C. is provided in or combined with an already existing component for thermal and/or acoustic shielding.

A solution according to the invention thus provides an active electrical heating of components in a vehicle, which are mentioned above by way of example, by means of at least one heating element or a plurality of heating elements, where a known shielding element can simultaneously function as both a support and an electrical insulation. The existing shielding element also produces a thermal insulation in order to reduce a radiation of the heat produced by the heating element, particularly into the surroundings, and to supply selective radiation to a component that is to be heated.

A combination of at least one heating element with an already existing component for thermal and/or acoustic shielding has the inherent advantage that it is thus possible for an electrical insulation and also a thermal insulation to already be present, at least in relation to the surroundings. The correspondingly enhanced thermal and/or acoustic shielding element and the at least one heating element, as a novel heating system, thus still enclose the component, which is to be heated, in the known way and the required energy is introduced from the outside in the form of electrical energy. Electrical current from a voltage source such as the vehicle's electrical system flows through the heating system in a known way so that the heating system warms up. According to Ohm's law, the thermal output on the one hand depends on the value of the electrical resistance. This is calculated as a function of the material's inherent resistance, the cross-section, and the length of the heating resistor. The other decisive factor for the thermal output is the voltage that is applied to the heating resistor. For example, the vehicle's electrical system is used as a voltage source and here in particular, the increased supply voltage, e.g. a planned 48 V vehicle electrical system, which will be available as standard equipment in future vehicles. This minimizes additional expense in production, installation, and replacement.

By comparison with approaches known from the prior art for designing an electrical heating system, the advantages of a solution according to the invention include, among others, possible weight savings relative to known heating systems that are integrated into components of a drive train, cost savings e.g. through elimination of a separate electrical and/or thermal insulation for the at least one heating element, and an ability to be simply retrofitted into an existing system with simultaneously good accessibility through modification of an already existing component.

A method for producing and shaping a heating element is also proposed as a solution for attaining the above-mentioned object, in which a production is carried out based on the teaching disclosed in DE 10 2015 121 397 A1 in that the at least one heating element is fixed in position in advance with an insulation layer and is wetted or impregnated with a suspension and joined thereto during a 3-D shaping process and a thermoforming process.

Advantageous modifications are the subject of the respective dependent claims. The at least one heating element is thus embodied as a resistance wire or panel element. In a preferred embodiment of the invention, the at least one heating element is embodied as a resistance wire or panel element through which an electric current flows. With the use of a panel element as an alternative to the use of wires, discrete conducting paths for the flow of current are produced by means of insulating breaks in the panel element. The panel element can alternatively be correspondingly printed in the form of a conductive paste or when using a preferably metallic foil, can have correspondingly stamped cut-outs or be cut by lasers. It is thus possible to form a network structure and/or an arrangement similar to an expanded metal, through which electrical current flows in the most homogeneous possible way, even after a three-dimensional deformation.

In the form of a resistance wire, the heating element is preferably positioned in a meandering shape or an annular shape. A heating element in the form of a resistance wire, which, according to one embodiment of the invention, extends in loops or meanders, is in this sense considered to be a panel element. The common goal in all of the above-mentioned embodiments is to be able to ensure the most even possible heat input into the system that is to be heated, without sporadic overheating.

In a preferred embodiment of the invention embodiment of the invention [sic], the heating element is positioned so that it is integrated onto or into a thermal and/or acoustic shielding, which in embodiments of the invention is also embodied as a multilayer shielding element with physically different layers. In addition to respective materials, which are different, the material thicknesses of at least one respective inner and outer layer are variably adapted to a respective application and can in particular also correspondingly vary in particular zones and regions of the thermal and/or acoustic shielding element in accordance with the specified requirements there. In this connection, in addition to different material thicknesses of the layers, it is also possible to implement different material combinations of the layers, for example by using a silicate nonwoven and/or reinforced mica paper, which are bonded by means of a suspension in the course of a 3D shaping. Furthermore, in individual zones and/or regions of a shielding element, different and also differently designed and independently controllable heating elements can be provided to adjust different temperature ranges. It is thus possible for regions of a shielding element to also be equipped with only one heating element, but it is not necessary for an entire shielding component to be equipped with heating elements. According to the respective requirements, the respective regions or zones are correspondingly adapted in an optimal way to a respective application so that an electric heating can be carried out as efficiently as possible and on an as-needed basis in a respective zone.

Preferably, the at least one heating element is positioned in, against, or on the thermal and/or acoustic shielding so that in an installation position, it is oriented toward the component that is to be heated. It is also preferable for a side of the heating system, which, in an installation position, is oriented away from the component that is to be heated and which is correspondingly not to be heated itself, as a surface of a 3D shaped body, to be composed of a material with very good thermal and electrical insulation properties. It is thus also possible to minimize a distance in order to reduce thermal dissipation losses. By contrast, the side which, in an installation position, is oriented toward the component that is to be heated, is made of a material with poor thermal insulation properties and alternatively or in addition, has a lower layer thickness. A limit on this layer thickness is placed for example by a required minimum electrical insulation.

Heat conductors that are available on the market, particularly when intended for use in the high temperature range, have either glass fiber or silicate fiber braided around them. In addition, there are also mineral-insulated jacket-type heating conductors of the kind that are known, for example, from immersion heaters. In addition to heat conductors, heating mats are also known. With heating mats, either the heat conductor is embedded in a pourable material such as silicone or a heat conductor is fastened to a netting or weave composed of glass fibers or silicate fibers. The silicone-based heating mats, however, specifically have the disadvantage that they are not temperature-resistant into high temperature ranges of up to 1,000° C. For an optimum heat input into a system that is to be heated, however, all of the variants mentioned above must also be thermally insulated to prevent excessive heat from being lost to the surroundings. In known devices, this thermal insulation is installed as a separate layer. In order to prevent the thermal insulation from slipping, for example relative to a heating mat, during installation, the heating mat and the thermal insulation are frequently packed into a kind of bag. The production of such devices is often time-consuming and expensive. This latter factor is advantageously made obsolete according to the invention by placing the at least one heating element between two layers of the containing shielding since the at least one heating element is thus placed so that it is simultaneously insulated both electrically and thermally. Furthermore, a placement between two planes has a comparatively low susceptibility to slipping so that in particular, it is possible to dispense with providing an additional bag.

Advantageously, at least one conducting path or supply line for a defined current supply to at least one heating element is incorporated into the composite material so that a means for producing an electrical connection, e.g. in the form of a plug or some other interface, is positioned outside of a 3D shape of the finished shaped part. This ensures a possibility of connecting the heating element, even taking into account a 3D shape of the finished shaped part.

Preferably, the heating system is embodied as a flexible and/or deformable mat or net, with materials, which are adapted for a wide variety of temperature ranges, being provided for constructing the structure that is to be heated. In this instance, particular care is taken that the utilized materials themselves cannot conduct current. The adapted materials are also provided in some regions, particularly with large-area components, in order to equip particular heating zones in a correspondingly more heat-resistant way than surrounding regions.

In one modification of the invention, the heating element is embodied as a foil, which preferably contains electrically conductive fiber-filled thermoplastic composite materials. Other thermoplastic matrixes are used for this foil depending on the temperature range.

In one embodiment of the invention, several copper tracks for a defined current supply are preferably incorporated into the composite material. In connection with a grounding line, an electrical insulation of the heating element and/or an electrostatic discharge by means of ohmic conductors is/are possible.

Another type of heating system consists, for example, of a woven mat, which is equipped with heating elements. The heating elements are once again embodied of different materials depending on the temperature range and are attached to the woven mat.

In one embodiment of the invention, heating elements based on nickel-chromium alloys are used for a high temperature range of about 900 to approx. 1,000° C.

In addition, numerous different types of flexible heating mats are known, which can be used for a wide variety of temperature ranges. Heating mats with silicone covers can be used for temperatures of up to approx. 200° C., whereas heating mats in a crocheted embodiment can be used for the high temperature range also from 400° C. to approx. 900° or even 1,000° C. In addition to the heating foils and heating mats, it is also possible to integrate heating systems in the form of nets. For corresponding temperature ranges, these can consist for example of a network of glass fibers, which are coated with carbon nanotubes and insulating material.

BRIEF DESCRIPTION OF THE DRAWINGS

Other features and advantages of embodiments according to the invention will be described in greater detail below with reference to exemplary embodiments based on the drawings. The drawings schematically depict the following.

The same reference numerals are consistently used for the same elements throughout the various figures and exemplary embodiments.

DETAILED DESCRIPTION OF THE PREFERRED EMBODIMENTS

An enhancement according to the invention of a thermal and/or acoustic shielding element with the additional functionality of the ability to be electrically heated by means of a heating system is basically not limited to a special application. The integration of this type of heating into the shielding element can be carried out in a wide variety of forms. For example, it can be integrated into a shielding element, which is used for direct insulation. By means of this, it is possible, for example, for an exhaust gas cleaning based on the use of a catalytic converter to function earlier and in both spark-ignition engines and diesel engines, can therefore reduce the emissions and fuel consumption and thus also the $CO_2$ emissions of a motor vehicle, for example. Moreover, it is also conceivable to integrate the heating system into a multilayer shielding element. Without further discussion of this in detail based on drawings herein, it should be noted that even in drive trains utilizing fuel cells or batteries, such an ability to be heated can also be present in shielding elements utilized in a wide variety temperature ranges, which are now given a special additional functionality by being combined with a heating system.

Not only can the heating system be provided for different temperature ranges, with higher temperature ranges above approx. 180° C. up to high temperature ranges of approx. 1,000° C. being of particular interest, the heating system can also be embodied in a wide variety of forms and can be three-dimensionally deformed within a broad range. For this reason, in the following, different embodiments are only depicted in very enlarged detail views and are described basically as arrangements for the integration of a heating system into a shielding element, without discussing in further detail the design of the actual heat shield or the type of drive train or component thereof that is to be heated.

Figure 1:
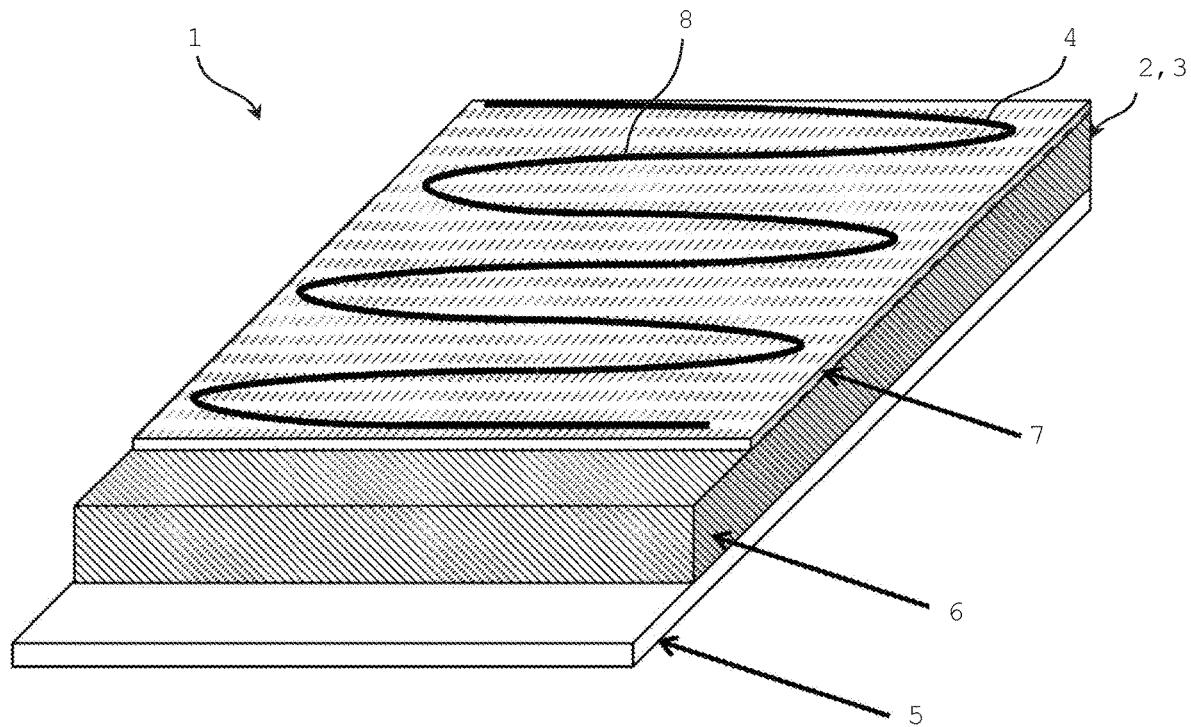
FIG. 1: is a perspective view of an exemplary embodiment with integration of an electrical heating system in a shielding element for a direct insulation.

In the depiction in FIG. 1, a small detail of a shaped body is shown by way of example, representing a schematic design for the possible integration of a novel heating system 1 into an existing component 2. In preferred embodiments of the invention, the component 2 is a thermally and/or acoustically effective shielding element 3 e.g. as part of a larger shielding system, which is depicted here as being embodied for a direct insulation of an internal combustion engine, which is not shown in detail, or a component of an exhaust gas system connected directly thereto. In this case, such a part of an exhaust gas system is a catalytic converter, which is provided adjoining a manifold in an exhaust train of the internal combustion engine. Operating temperatures of catalytic converters are generally in the range from below 900° up to approx. 1,000° C. In order to ensure the best possible functionality of the catalytic converter, even after a cold start of the internal combustion engine, a respective temperature range of a controlled operation should be achieved as quickly as possible, particularly at low ambient temperatures.

On the other hand, ensuring an effective reduction of nitrogen oxides, $NO_x$, in the exhaust gas requires a temperature of approx. 180° C. in the region of a urea injection. The conversion of nitrogen oxides by means of injected urea generally cannot occur below the above-mentioned threshold temperature. It is known, however, that an internal combustion engine or motor itself can become too cold during ongoing operation, as a result of which the temperature can fall below the above-mentioned threshold temperature, with the result that an exhaust gas has too high a concentration of nitrogen oxides. Here, too, a method for controlled preheating of the motor and/or an adjoining exhaust gas system is both useful and desirable.

A shielding element 3 for both of the above-mentioned scenarios is described below. It should be stressed here in this connection that with an appropriate size of this shielding element 3, a different heating ability can be provided across certain zones. It is thus basically possible in one zone of the shielding element 3 to set the boundary conditions for the most efficient possible operation e.g. of an exhaust-gas catalytic converter with a platinum-coated ceramic body in its high operating temperature range, but in another region, to only set a minimum temperature of approx. 180° C. in order to ensure a reliable and efficient nitrogen reduction in the exhaust gas flow by means of regulated reheating. In this sense, a shielding element 3 can be segmented in order to be able to ensure a respectively predetermined temperature level through regulated selective heating before, around, or after a catalytic converter, viewed in the flow direction of an exhaust gas.

For this purpose, the thermal and/or acoustic shielding element 3 respectively includes at least one heating element 4 and opposite from this, toward the outside, has a metallic reflective layer 5, which is actively effective in preventing thermal radiation. On the reflective layer 5, there is a thermal insulation layer 6, onto which a flat structure 7 is mounted, which in turn includes a meandering resistance wire 8. In an installation position, this flat structure 7 of the heating system 1 is positioned directly adjacent to the part or region of an internal combustion engine or component thereof that is to be heated, if possible, even with a direct surface contact that provides only electrically insulation.

Figure 2:
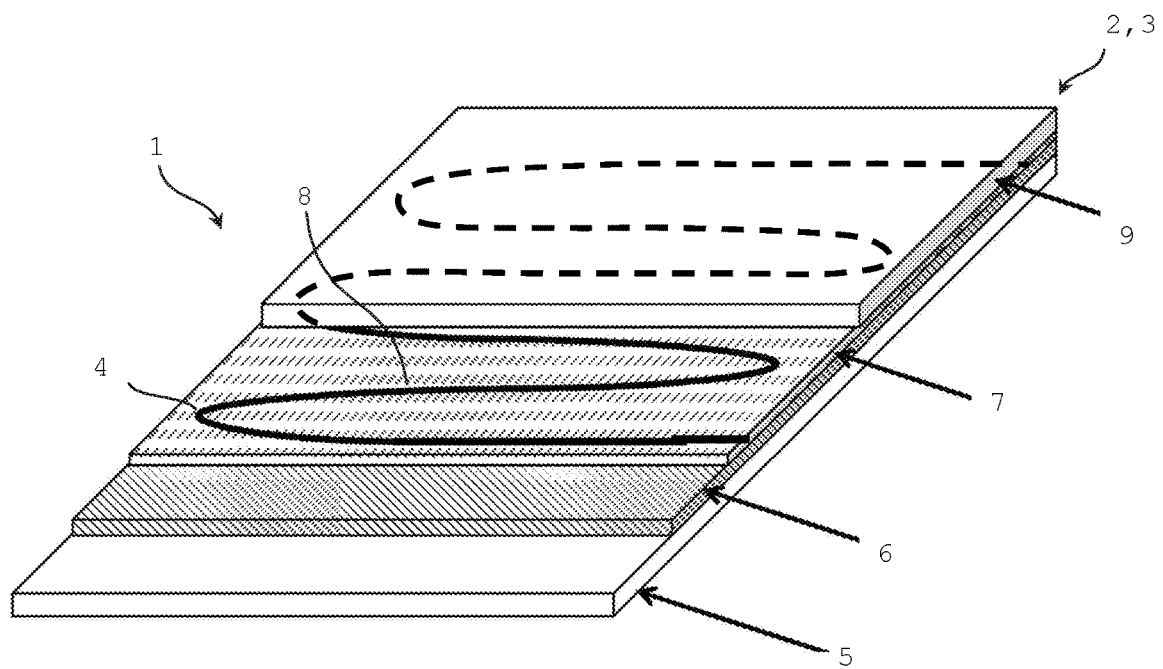
FIG. 2: is a perspective view of an exemplary embodiment with integration of a heating system into a multilayer shielding element.

In the exemplary embodiment in FIG. 2, a schematic design is shown for the possible integration of the heating system 1 into a multilayer shielding element 3. As compared to the exemplary embodiment in FIG. 1, the exemplary embodiment according to FIG. 2 has been enhanced under different geometrical circumstances with a metallic layer 9, which now covers the flat structure 7 of the heating system 1.

The flat structure 7 is thermally conductive and is embodied as electrically insulating by means of a corresponding layer, not shown in greater detail here, in order to more evenly distribute the quantity of heat emitted by the resistance wire 8. Instead of using a resistance wire 8—which is shown with a meandering shape by way of example—as the actual heat source, in another exemplary embodiment that is not graphically depicted in greater detail here, the flat structure 7 itself is also embodied as an electrically conductive heating foil, as a woven mat with heating elements positioned therein and electrically connected thereto, or as a heating mat that is embodied as flexible and deformable. In comparison to one or more resistance wires 8, the latter embodiments can feature improved deformability so that in addition, all of the currently customary three-dimensional shapes of thermal and/or acoustic shielding elements can be produced with the additional functionality of an electrically regulatable ability to heat an adjacent drive train or component thereof.

Figure 3:
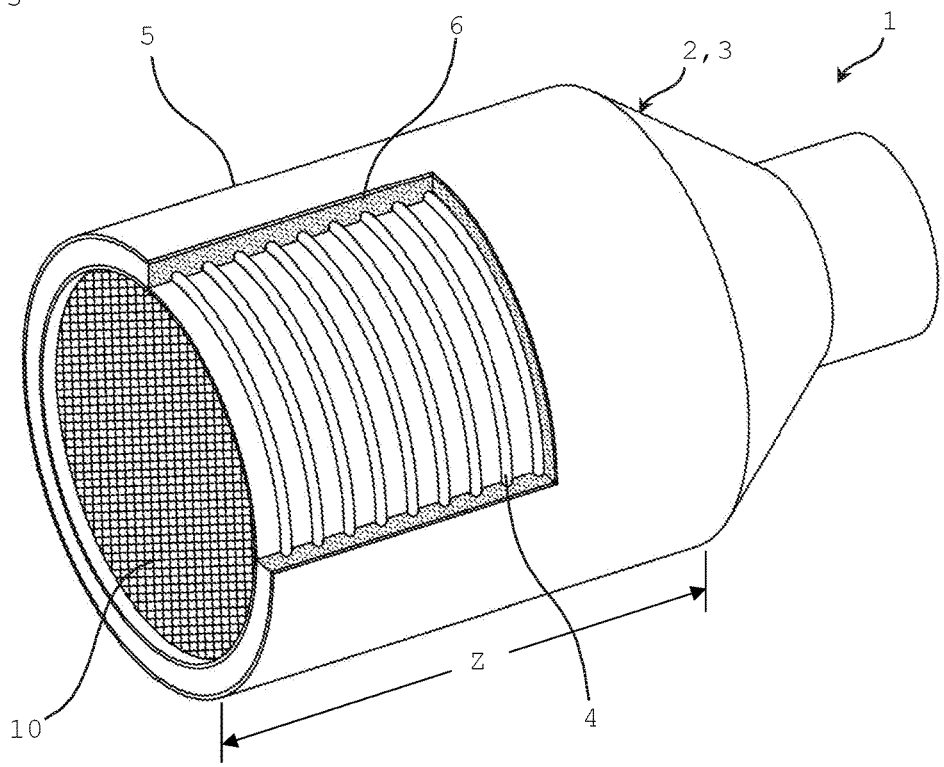
FIG. 3: is a partially cut-away three-dimensional view of an exhaust-gas catalytic converter enclosed by a shielding element and equipped with a heating element.

FIG. 3 shows a partially cut-away three-dimensional view of a heating system 1 with a shielding element 3 that is covered on the outside by a metallic reflective layer 5 with a known exhaust-gas catalytic converter 10, which in a particular zone Z, achieves a heat output of 1 to 5 kW at different rated voltages, e.g. 48 V, by means of a heating element 4 analogous to the exemplary embodiment from FIG. 1. A more rapid achievement of an optimum set-point operating temperature is achieved by means of an intensive contact between the heating element 4 and the catalytic converter 10, which in this case due to a coating, functions in an electrically insulating fashion and results in a significant reduction in $NO_x$ and $CO_2$ emissions, even in a cold start phase or with operationally dictated excessive cooling. In test cycles such as the WLTC measurement method for determining exhaust gas emissions, an electrical energy consumption turned out to be much lower than a recuperation potential.

Figure 4:
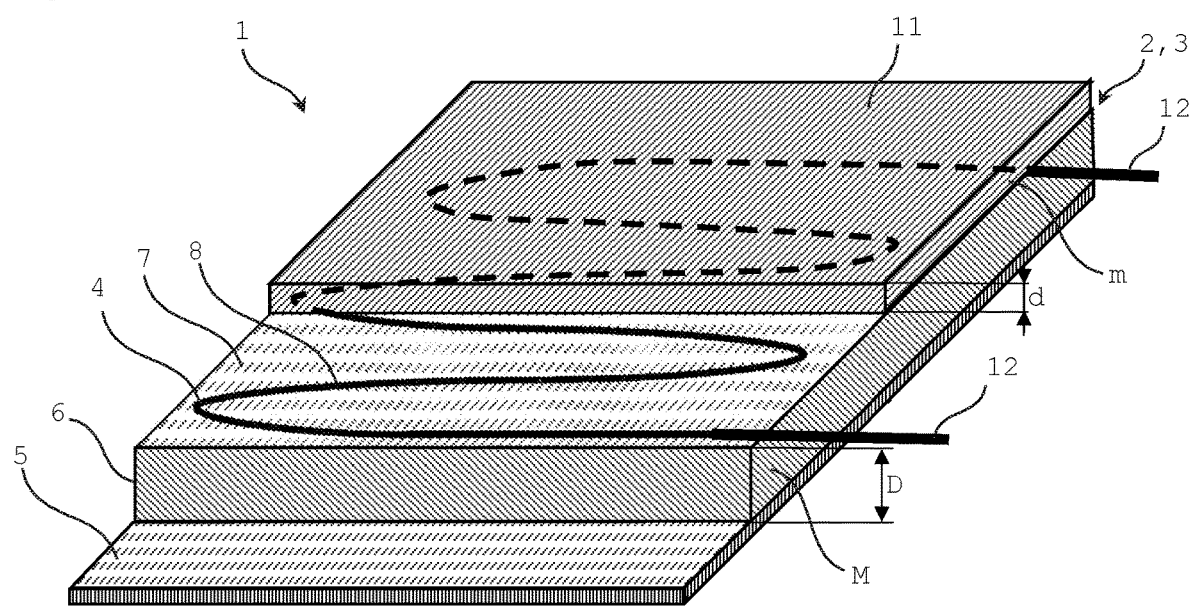
FIG. 4: is an exemplary embodiment with integration of a heating system into a multilayer shielding element with physically different layers and a metallic foil serving as a reflective layer on a side oriented away from the component that is to be heated, in a view analogous to the one in FIG. 1.

FIG. 4 then shows an exemplary embodiment of a shielding element 3 with integration of a heating element 4 into a multilayer shielding element with physically different layers and a metallic foil 5. The metallic foil 5 is once again used as a reflective layer on a side oriented away from a component that is to be heated. The heating element 4 is thus positioned in an electrically and thermally insulated way between two layers of physically different insulating layers 6, 11 of the shielding element 3. The insulating layer 6 made of a material M with a thickness D constitutes an outer layer while the insulating layer 11 made of a material m and a thickness d constitutes an inner layer. Without further graphic representation, it is thus basically possible, in one shielding element 3 functioning as single component, to achieve different zones Z, which satisfy different boundary conditions and requirements with regard to a thermal and/or acoustic insulation and/or a minimum temperature that is to be maintained through adaptation of respective heating elements 4. Such a component with different electrical connections can even be advantageously produced of one piece, which basically also makes it quick and easy to install.

A production process according to the teaching of DE 10 2015 121 397 A1 includes the fact that the insulation layers 6, 11, which are composed of a nonwoven, in order to form a dimensionally stable shielding element 3 with a predetermined 3D shape, are wetted or impregnated with a suspension, depending on the application, by means of known methods and are subjected to a thermoforming process. The end product is then a combination of an acoustically open, dimensionally stable nonwoven material with a heating system imbedded therein, which also constitutes a combination of a thermal, acoustic, and electrical insulation with an electrical heating system. Combining different materials m, M and material thicknesses d, D ensures an optimum adaptation of the electrical heating system to the system that is to be heated, it being possible to produce the entire heating system so that it is as close as possible to its final geometry. In the small detail shown in FIG. 4 of a shielding element 3 that is also three-dimensionally deformed, the outer insulation layer 6—as a side of the heating system 1, which, in an installation position, is oriented away from the component to be heated and which is not to be heated itself, and as a surface of the 3D shaped body 2—consists of a material M with very good thermal and electrical insulation properties and has a layer thickness D. By contrast, the insulation layer 11 oriented toward the component that is to be heated in an installation position consists of a material m with poorer thermal insulation and also has a smaller layer thickness d.

As the component 2 continues, material thicknesses d, D of the inner insulation layer 11 and outer insulation layer 5 as well as material combinations and their thermal conductivities m, M can correspondingly be variably adapted to a respective application. It is thus possible for certain zones and regions of the thermally and/or acoustically effective shielding element 3 to be particularly embodied in accordance with predetermined requirements there in order to thus also selectively make use of a possible electrical heating. It should be noted that it is possible both to place the heating wire between two different materials and to place it between two materials that are the same. This can relate to the thickness, the density, or the type of materials. The important thing is that the side oriented away from the component that is to be heated is selected with particular attention to its thermal and/or acoustic properties. The side oriented toward the component that is to be heated should be selected particularly with a view to electrical insulation. Furthermore, the inner insulating layer 11, as the inner layer of the heating system 1, should have the highest possible thermal conductivity in order for the component that is to be heated not to be excessively shielded from the generated heat. A side oriented away from the component, however, should consist of a material M, which has a particularly low thermal conductivity.

A connection means 12 is a conducting path or supply line for a defined current supply to the at least one heating element is incorporated into the above-described composite material of the heating system 1 so that a means for electrical connection, which is not shown in detail, e.g. in the form of a plug or another interface, is positioned outside a 3D shape of the finished shaped part. A possibility of connecting the heating element is thus ensured at all times, even taking into account a 3D shape of the finished shaped part.

The invention claimed is:

1. A heating system for a drive train or a component thereof, comprising:
at least one heating element for active electrical heating of a drive train or component thereof from a temperature above about 180° C. and up to about 1,000° C., wherein the at least one heating element is based on nickel-chromium alloys,
in combination with or in an already existing component for thermal and/or acoustic shielding having a metallic reflective layer on its outside with an adjoining thermal insulation layer, wherein the at least one heating element is arranged in, against, or on the thermal insulation layer so that in an installation position, the at least one heating element is oriented toward the drive train or the component thereof to be heated, and the metallic reflective layer is a metallic foil positioned on a side of the thermal insulation layer facing away from the drive train or the component thereof to be heated.

2. The heating system according to claim 1, wherein the at least one heating element is embodied as a resistance wire or as a panel element.

3. The heating system according to claim 1, wherein the at least one heating element is embodied as a heating element in the form of a resistance wire that extends in loops or meanders.

4. The heating system according to claim 3, wherein the at least one heating element is positioned so that the at least one heating element is integrated onto or into a thermal and/or acoustic shielding and the acoustic shielding is embodied as a multilayer shielding element with physically different layers.

5. The heating system according to claim 1, wherein a side of the heating system, which, in an installation position, is oriented away from the component that is to be heated and which is not to be heated itself, as a surface of a 3D shaped body, consists of a material with very good thermal and electrical insulation properties.

6. The heating system according to claim 1, wherein the at least one heating element is positioned on the thermal and/or acoustic shielding element so that in an installation position, the at least one heating element is oriented toward the component that is to be heated and an outer insulation layer facing the component that is to be heated consists of a material with poorer thermal insulation and/or has a smaller layer thickness than an inner insulation layer.

7. The heating system according to claim 6, wherein material thicknesses of a respective inner insulation layer and outer insulation layer and material combinations are variably adapted to a respective application and/or heating elements for adjusting different temperature ranges are provided in particular zones and/or regions of the thermal and/or acoustic shielding element in accordance with specified requirements there.

8. The heating system according to claim 1, wherein the at least one heating element is embodied as a foil, which contains electrically conductive fiber-filled thermoplastic composite materials, and other thermoplastic matrixes are used depending on a temperature range.

9. The heating system according to claim 8, wherein a plurality of copper tracks for a defined current supply are incorporated into a composite material of the inner and outer insulation layers in the at least one heating element.

10. The heating system according to claim 1, further comprising a woven mat that is equipped with the at least one heating element.

11. The heating system according to claim 1, wherein the heating system is embodied as a flexible and/or three-dimensionally deformable heating mat and locally adapted materials are provided for a wide variety of temperature ranges.

12. The heating system according to claim 11, further comprising at least one connection means of a conducting path or supply line for a defined current supply to the at least one heating element, which at least one connection means, for an electrical connection, is positioned outside of a 3D shape of a finished shaped part.

13. A method for producing and shaping a heating system according to claim 1, comprising fixing the at least one heating element in position with an insulation layer, and wetting or impregnating the at least one heating element with a suspension, and joining the at least one heating element to the insulation layers during a 3-D shaping process and a thermoforming process.

* * * * *